United States Patent
Selegean et al.

(10) Patent No.: US 11,366,735 B2
(45) Date of Patent: Jun. 21, 2022

(54) DYNAMIC DATA STORAGE MANAGEMENT

(71) Applicant: Bank of America Corporation, Charlotte, NC (US)

(72) Inventors: Jane Selegean, New York, NY (US); Lokeshvar Iyanar, Charlotte, NC (US); Ram Vignesh Suresh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 203 days.

(21) Appl. No.: 16/998,517

(22) Filed: Aug. 20, 2020

(65) Prior Publication Data
US 2022/0058100 A1    Feb. 24, 2022

(51) Int. Cl.
G06F 11/30    (2006.01)
G06F 9/50     (2006.01)
G06F 11/34    (2006.01)

(52) U.S. Cl.
CPC ........ *G06F 11/3082* (2013.01); *G06F 9/5022* (2013.01); *G06F 11/3034* (2013.01); *G06F 11/3409* (2013.01)

(58) Field of Classification Search
None
See application file for complete search history.

(56) References Cited

U.S. PATENT DOCUMENTS

| | | |
|---|---|---|
| 3,726,993 A | 4/1973 | Lavallee |
| 5,861,827 A | 1/1999 | Welch et al. |
| 5,893,102 A | 4/1999 | Maimone et al. |
| 6,122,378 A | 9/2000 | Yoshiura et al. |
| 6,154,756 A | 11/2000 | Hearn et al. |
| 7,116,249 B2 | 10/2006 | McCanne et al. |
| 7,403,136 B2 | 7/2008 | De La Cruz et al. |
| 7,512,954 B2 | 3/2009 | Srivastava et al. |
| 7,852,237 B2 | 12/2010 | McCanne et al. |
| 7,860,843 B2 | 12/2010 | Dodd et al. |
| 8,099,674 B2 | 1/2012 | Mackinlay et al. |
| 8,230,417 B1 | 7/2012 | Clark et al. |
| 8,508,389 B2 | 8/2013 | McCanne et al. |
| 8,819,010 B2 | 8/2014 | Fankhauser et al. |
| 8,832,045 B2 | 9/2014 | Dodd et al. |
| 8,886,909 B1 * | 11/2014 | De Forest ............... G06F 13/28 711/170 |
| 9,053,238 B2 | 6/2015 | Krishnan et al. |
| 9,348,879 B2 | 5/2016 | Mohammad et al. |
| 9,471,405 B1 | 10/2016 | Mor |
| 10,025,878 B1 | 7/2018 | Lefever et al. |

(Continued)

*Primary Examiner* — Qing Chen

(57) ABSTRACT

A storage management subsystem monitors usage of the data stored by a data storage system. Based at least in part on the monitored usage of the stored data, a storage profile is determined for the stored data. The storage profile indicates a first time period during which a first portion of the stored data is anticipated to be accessed and a second portion of the stored data is not anticipated to be accessed and a second time period during which the first portion of the stored data is not anticipated to be accessed. During at least the first time period, the first portion of the data is stored in a decompressed format and the second portion of the data is stored in a compressed format. During at least the second time period, the first portion of the data is stored in the compressed format.

20 Claims, 4 Drawing Sheets

(56) References Cited

U.S. PATENT DOCUMENTS

| | | | |
|---|---|---|---|
| 10,042,732 B2 | 8/2018 | Wu et al. | |
| 10,055,455 B2 | 8/2018 | Bagehorn et al. | |
| 10,095,800 B1 * | 10/2018 | Yalamanchi | G06F 16/972 |
| 10,156,993 B1 | 12/2018 | Armangau et al. | |
| 10,157,006 B1 | 12/2018 | Armangau et al. | |
| 10,210,240 B2 | 2/2019 | Vasisht et al. | |
| 10,303,690 B1 | 5/2019 | Todd et al. | |
| 10,331,660 B1 | 6/2019 | Chapin | |
| 10,346,043 B2 | 7/2019 | Golden et al. | |
| 10,346,429 B2 | 7/2019 | Jacob et al. | |
| 10,353,911 B2 | 7/2019 | Reynolds et al. | |
| 10,394,532 B2 | 8/2019 | Bar-Or et al. | |
| 10,430,376 B1 | 10/2019 | Armangau et al. | |
| 10,489,384 B2 | 11/2019 | Gould et al. | |
| 10,496,926 B2 | 12/2019 | Florissi et al. | |
| 10,503,905 B1 | 12/2019 | Misra et al. | |
| 10,528,554 B2 | 1/2020 | Bagehorn et al. | |
| 10,528,759 B2 | 1/2020 | Kujawski | |
| 10,540,334 B1 | 1/2020 | Eswaran et al. | |
| 10,540,358 B2 | 1/2020 | Wu et al. | |
| 2006/0053263 A1 * | 3/2006 | Prahlad | G06N 5/04 711/161 |
| 2007/0234285 A1 | 10/2007 | Mendoza et al. | |
| 2017/0270022 A1 | 9/2017 | Moresmau et al. | |
| 2018/0039679 A1 | 2/2018 | Endres | |
| 2018/0240273 A1 | 8/2018 | Gordon et al. | |
| 2018/0314622 A1 | 11/2018 | Lowe et al. | |
| 2019/0155826 A1 | 5/2019 | Vasisht et al. | |
| 2019/0196935 A1 | 6/2019 | Edwards et al. | |

\* cited by examiner

DYNAMIC DATA STORAGE MANAGEMENT

TECHNICAL FIELD

The present disclosure relates generally to data storage systems, more specifically to dynamic data storage management.

BACKGROUND

Data may be generated when users interact with applications and when electronic systems are operated. This data may be stored in a database or data store. For example, a database may receive data from data sources and store the data for use at a later time.

SUMMARY

In one embodiment, a system includes a data storage system that stores data from one or more data sources. A storage management subsystem is communicatively coupled to the data storage system and monitors usage of the data stored by the data storage system. The usage of the stored data includes events associated with receipt of additional data by the data storage system and/or access to portions of the stored data. Based at least in part on the monitored usage of the stored data, a storage profile is determined for the stored data. The storage profile indicates a first time period during which a first portion of the stored data is anticipated to be accessed and a second portion of the stored data is not anticipated to be accessed and a second time period during which the first portion of the stored data is not anticipated to be accessed. During at least the first time period, the first portion of the data is stored in a decompressed format and the second portion of the data is stored in a compressed format. During at least the second time period, the first portion of the data is stored in the compressed format.

Previous technology used to manage electronic data storage can be inefficient and unreliable. For example, the characteristics (file size, data content, etc.) of data provided to a data storage system, such as a database, can change over time, and the storage system may not always be appropriately configured to efficiently and reliably store incoming data. For example, data from a given source may be associated with an initial file size when it is received in a first batch. However, the database or datastore may lack sufficient storage space (e.g., memory) if the file size increases in a second batch of data received from this source at a later time. Previous technology also fails to accommodate the storage of data from new data sources (e.g., data associated with newly identified systems, users, applications, and the like) without extensive development and testing for the manual configuration of the data storage system to receive the new data.

Certain embodiments of this disclosure provide unique solutions to technical problems of previous data storage technology, including those problems identified above by providing intelligent tools and approaches for operating a data storage system based on anticipated use of stored data and associated storage capacity needs. For example, the disclosed systems provide several technical advantages over previous technology, which include: (1) more efficient and reliable operation of a data storage system with fewer downtimes for reconfiguration to handle changing data sources; (2) the automatic configuration of the data storage system to receive data from new data sources; and (3) the automatic compression and decompression of stored data based on data-specific storage profiles based on a history of the use of the data. As such, this disclosure may improve the function of computer systems used to store data from one or more data sources. For example, in some embodiments, data compression and decompression may be automatically implemented based on the anticipated usage of the data storage system. These features may ensure data is reliably available in an efficiently usable form (e.g., in a decompressed form if the data is anticipated to be accessed soon) based on anticipated usage of the data. Similarly, an anticipated usage may indicate that a large amount of data will be received by the data storage system, and system infrastructure may be automatically scaled (e.g., by increasing computing resources available to the system) in order to accommodate the anticipated incoming data. This disclosure may particularly be integrated into a practical application of a data management subsystem, which automatically implements management tasks for an associated data storage system by detecting new data sources, allocating storage to data from these sources, building storage profiles for this data, and intermittently updating, based on the storage profiles, how the data is handled by the data storage system (e.g., how the data is compressed/decompressed and/or how storage resources are allocated for storing the data) and how computing resources are provisioned to the data storage system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technology lacks tools for efficient and reliable management of data storage systems such as databases, datastores, and the like. For example, previous approaches relying on trial and error and resource-intensive testing result in slow development and inefficient use of the computing resources used for testing, developing, and operating data storage systems. This disclosure provides a new approach to data storage management by dynamically adjusting how information is stored in a data storage system and/or the hardware infrastructure allocated to a data storage system. For example, usage of the data storage system may be monitored to determine a storage profile for data from a given data source, and this storage profile may be used to dynamically adjust when stored data is compressed/decompressed, the amount of storage resources allocated for storing data from the data source, and/or the amount of computing resources provisioned to the data storage system.

Data Storage System

Figure 1:
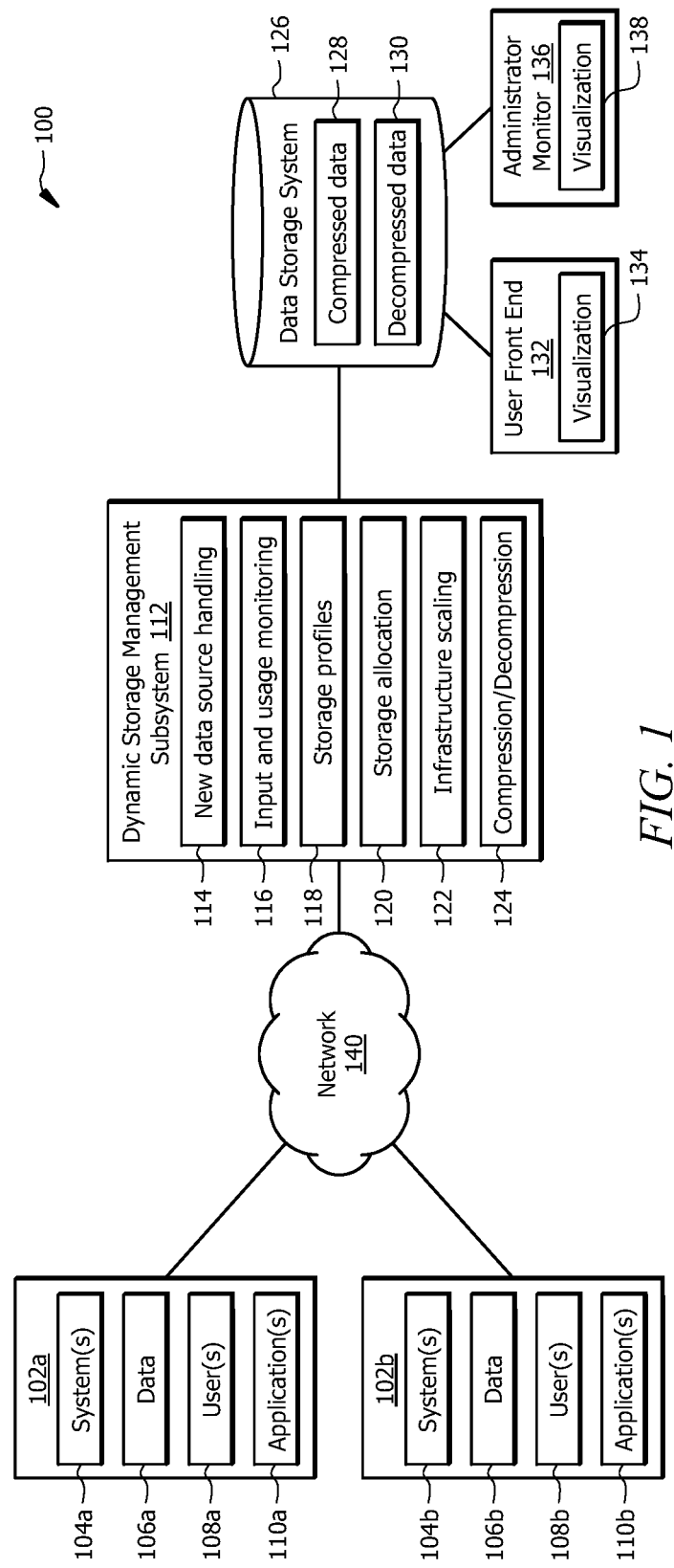
FIG. 1 is a schematic diagram of an example system configured for automatic data storage management.

FIG. 1 is a schematic diagram of an example system 100 for data storage. The system 100 generally facilitates the efficient management of data 128, 130 stored in a data storage system 126 and/or for reconfiguration of the data storage system 126 for improved efficiency and usability. The system 100 includes one or more data sources 102a,b, a dynamic storage management subsystem (DSMS) 112, at least one data storage system 126, a user front end 132, an administrator monitor 136, and a network 140. As described in greater detail below with respect to FIGS. 2-3, the system 100 generally facilitates automatic management of data storage system(s) 126, such that data 128, 130 can be reliably stored in the data storage system 126 and data 128, 130 can be reliably retrieved (e.g., using a user front end 132). For example, the DSMS 112 may implement various processes, including: (1) the allocation 120 of data storage resources (e.g., memory) of the data storage system 126 to appropriately store data 106a,b; (2) the scaling 122 of computing infrastructure available to the data storage system 126 (e.g., the automatic provisioning of additional storage capacity, compute nodes, or the like to the data storage system 126); and/or (3) intelligent compression/decompression based on anticipated usage of the data 128, 130 stored in the data storage system 126. Further examples of functions of the DSMS 112 are described in greater detail below.

Figure 4:
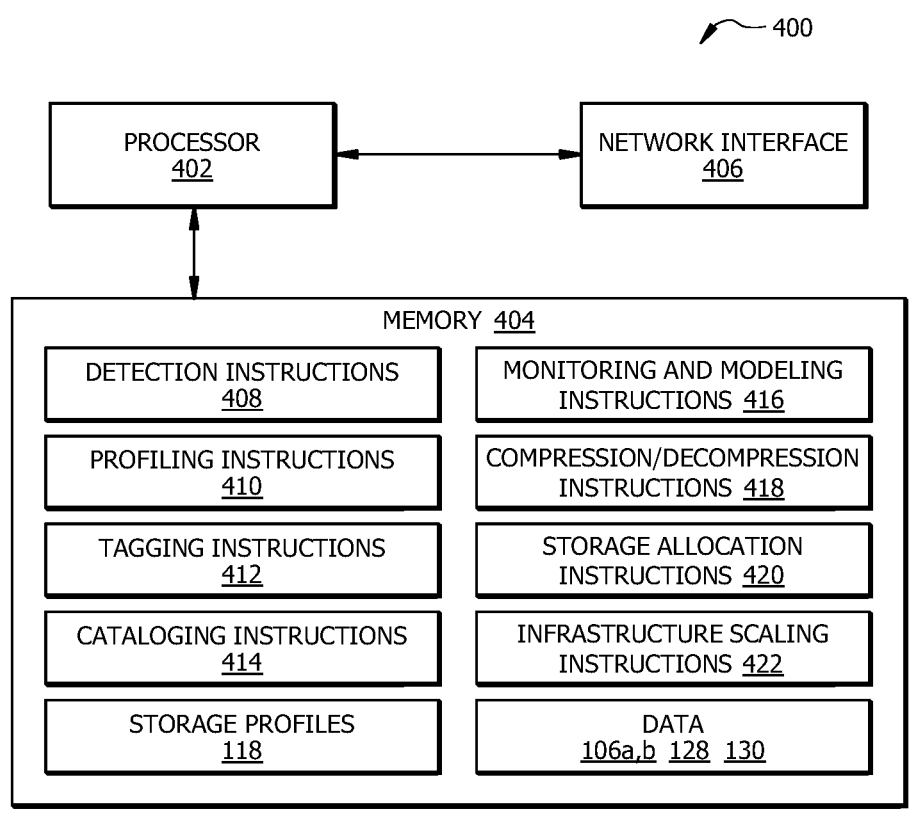
FIG. 4 is a diagram of an example device configured to implement various components of the system of FIG. 1.

Each of the data sources 102a,b may be any computing device or collection of computing devices (e.g., a collection of devices implemented as a server, a virtual server, or the like) from which data 106a,b may be provided for storage in the data storage system 126 (e.g., as data 128, 130). An example of a device for implementing a data source 102a,b is shown in FIG. 4 and described in greater detail below. A data source 102a,b may be associated with a system 104a,b, particular data 106a,b, one or more users 108a,b, and/or one or more applications 110a,b. A system 104a,b may include hardware and/or software components (e.g., a system may include a processor, memory, and network interface as described below with respect to FIG. 4). As an example, a data source 102a,b may be associated with a system 104a,b that collects and/or generates data 106a,b and provides the data 106a,b for storage in the data storage system 126. The data 106a,b may include any type of electronically stored information (e.g., stored in any format). Users 108a,b generally correspond to users of the systems 104a,b and/or applications 110a,b. As another example, a user 108a,b may operate an application 110a,b and/or system 104a,b. For instance, a user 108a,b may access an application 110a,b which provides data 106a,b for storage in the data storage system 126. The applications 110a,b include any software applications that execute code and/or instructions to perform one or more tasks. As an example, an application 110a,b may facilitate user interaction with one or more accounts, facilitate data analysis and/or presentation, may facilitate transactions, and the like. Data 106a,b collected and/or generated by the application 110a,b may be provided for storage in the data storage system 126.

The DSMS 112 may be any computing device or collection of computing devices (e.g., a collection of devices implemented as a server, a virtual server, or the like). An example of a device for implementing the DSMS 112 is shown in FIG. 4 and described in greater detail below. While shown as a separate device or subsystem in the example of FIG. 1, all or a portion of the functions of the DSMS 112 may be implemented using hardware (e.g., the processor, memory, and network interface—see FIG. 4) of the data storage system 126 (described below). The DSMS 112 generally automates a variety of tasks associated with the management of the data storage system(s) 126. The DSMS 112 is compatible with any computing infrastructure (e.g., central processing units (CPUs) and/or graphical processing units (GPUs)) and storage system type. For example, the DSMS 112 is compatible with a data storage system 126 that is a distributed data storage system (e.g., implemented using multiple distributed GPUs).

As described in greater detail below with respect to FIGS. 2-3, the DSMS 112 is configured to manage the storage of data 106a,b from known data sources 102a,b (e.g., sources 102a,b from which data 106a,b has previously been provided for storage in the data storage system 126) and new data sources 102a,b (e.g., sources 102a,b from which data 106a,b has not previously been provided for storage in the data storage system 126). For example, the DSMS 112 may include instructions for new data source handling 114, which facilitate the automatic configuration of the storage system 126 to efficiently and reliably receive and store data 106a,b from new data sources 102a,b. For example, the DSMS 112 may use the instructions for new data source handling 114 to detect a new data source 102a,b (e.g., a system 104a,b, data 106a,b, a user 108a,b, and/or an application 110a,b that has not previously provided data 106a,b for storage in the data storage system 126 (e.g., for which a storage profile 118 is not yet established). The instructions for new data source handling 114 may perform automatic storage allocation 120 in order to automatically allocate a portion of the data storage resources of the data storage system 126 (e.g., a portion of the memory 404 of FIG. 4) for storage of data 106a,b provided by the newly detected data source 102a,b.

The DSMS 112 may include instructions for input and usage monitoring 116. Input and usage monitoring 116 generally involves monitoring characteristics of the data 106a,b provided to the data storage system 126 (e.g., the input of data 106a,b) and how the data 128, 130 that is stored in the data storage system 126 is subsequently used (e.g., how often the data 128, 130 is accessed, at what times the data 128, 130 tends to be accessed, and the like).

Information determined by input and usage monitoring 116 may be used to establish and/or update storage profiles 118 for the data sources 102a,b (e.g., for the data 106a,b provided by the data sources 102a,b for storage in the data system 126). The storage profiles 118 generally include properties for configuring the data storage system 126 for storing the data 106a,b. For example, the data storage profiles 118 may include an amount of storage resources that should be allocated to the data 106a,b, an amount of storage resources needed to be provisioned to the data storage system 126 in order to reliably store the data 106a,b, and/or compression properties for the data 106a,b. The DSMS 112 may execute instructions for storage allocation 120 in order to allocate, based on the storage profiles 118, storage resources (e.g., memory 404 of FIG. 4) of the data storage system 126 for storage of data 106a,b. The DSMS 112 may execute instructions for infrastructure scaling 122 in order to provision, based on the storage profiles 118, appropriate computing resources (e.g., processing, memory, and/or network resources) to the data storage system 126 for handling data 106a,b provided from a data source 102a,b.

The DSMS 112 executes instructions for the automatic compression/decompression 124 of the data 128, 130 stored in the data storage system 126. The storage profiles 118 may include instructions (e.g., a schedule) for decompressing and compressing the data 128, 130 stored in the data storage system 126, such that the data 128, 130 is efficiently and reliably available to users. For example, past usage of the data 128, 130 may be monitored via input and usage monitoring 116, in order to determine a schedule for decompressing and/or compressing portions of the data 128, 130 at certain times (e.g., of the day, week, month, year, etc.). For example, traffic trends associated with the access of data 128, 130 may be monitored, and times during which greater than a threshold number of access events are typically detected may be considered high traffic times. The portion of the data 128, 130 that is commonly accessed during high traffic times may be decompressed (e.g., stored as decompressed data 130). Data 128, 130 that is not determined to be accessed during a given time period may be compressed during that time period (e.g., stored as compressed data 128). A similar schedule-based approach may be used for infrastructure scaling 122 (e.g., be increasing available computing resources during high traffic times determined by input and usage and monitoring 116).

The data storage system 126 is device or collection of devices (e.g., a collection of devices implemented as a server, a virtual server, or the like) configured to store data 128, 130. The data storage system may store compressed data 128 and decompressed data 130. The compressed data 128 may be data of any type that has been compressed using a compression algorithm (e.g., to decrease the storage resources needed to store the data 128). Compression may be "lossy" or "lossless." In lossy compression, a portion of the original data cannot be recovered when the compressed data 128 is decompressed (e.g., using the appropriate decompression algorithm). In lossless compression, the original data is fully recoverable when the compressed data 128 is decompressed. The decompressed data 130 is generally data of any type that is stored in a decompressed format. A given portion of data generally requires more storage resources (e.g., memory) when stored as decompressed data 130 than when stored as compressed data 128. In some cases, decompressed data 130 may be more efficiently and rapidly accessible to users of the data storage system 126 (e.g., because the decompressed data 130 is in a format that is immediately usable by the users). As described briefly above and in greater detail below with respect to FIGS. 2 and 3, the DSMS 112 may improve performance of the data storage system 126 by performing automatic compression and decompression 124 of the data 128, 130 such that the data 128, 130 is decompressed and efficiently accessible to users when needed and is compressed when not needed, such that computing resources of the data storage system 126 are used efficiently.

The user front end 132 is any software and/or hardware configured to facilitate user interaction with the data 128, 130 stored in the data storage system. For example, the user front end 132 may include a processor, memory, and network interface as described below with respect to the device of FIG. 4. The user front end 134 may access decompressed data 130 stored in the data storage system 126 and generate a visualization 134 based on the accessed data 130. The visualization 134 may be any report, table, chart, or the like based on the accessed portion of the data 130. It may be more efficient for the data accessed by the front end 132 to be decompressed data 130 rather than compressed data 128.

The administrator monitor 136 is any software and/or hardware configured to facilitate monitoring of the function and/or performance of the data storage system 126 by an administrator of the system 126. For example, the administrator monitor 136 may include a processor, memory, and network interface as described below with respect to the device of FIG. 4. The administrator monitor 136 may monitor the utilization of storage resources by the data storage system 126 and/or changes to storage allocation 120, infrastructure scaling 122, and/or compression/decompression 124 performed by the DSMS 112 and generate a visualization 138 based on the monitored information. The visualization 138 may be any report, table, chart, or the like based on the monitored information about the data storage system 126.

Network 140 facilitates communication between and amongst the various components of the system 100. This disclosure contemplates network 140 being any suitable network operable to facilitate communication between the components of the system 100. Network 140 may include any interconnecting system capable of transmitting audio, video, signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Figure 2:
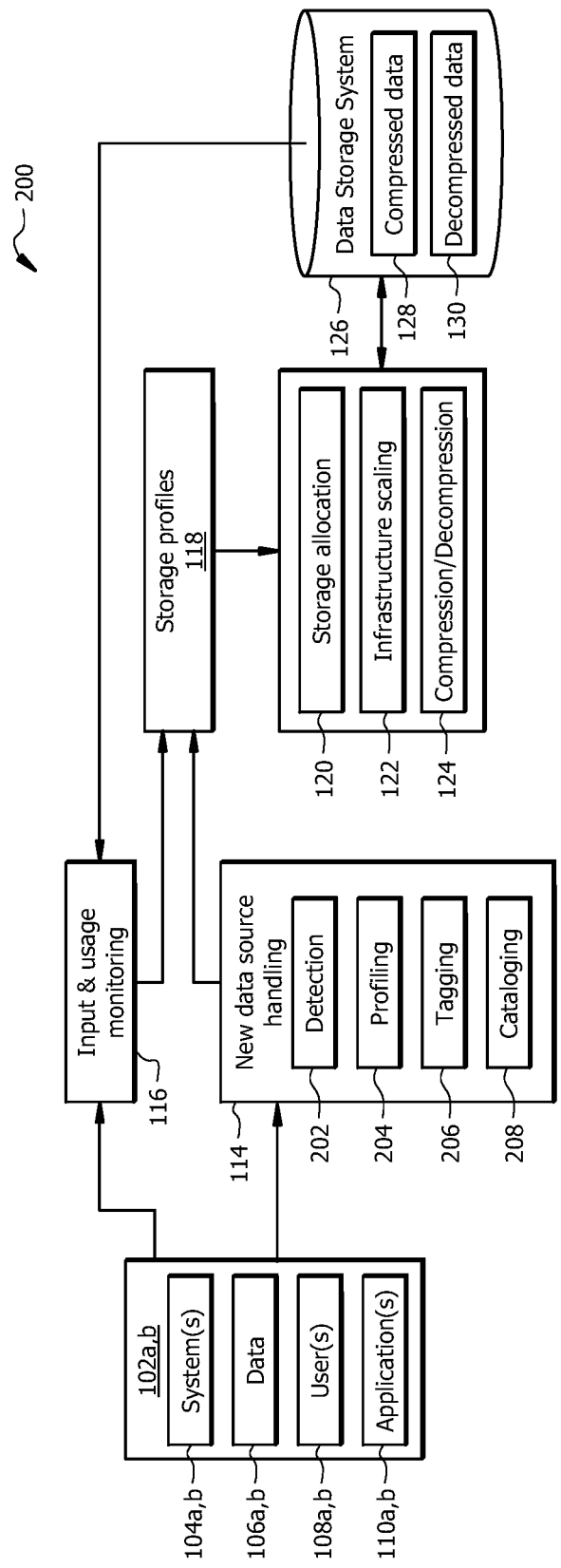
FIG. 2 is a flow diagram illustrating examples of operating the data management subsystem of FIG. 1.

FIG. 2 shows a flow diagram 200 illustrating an example operation of the system 100 of FIG. 1. New data source handling 114 may facilitate the detection 202 of a new data source 102*a,b*. The detection 202 of a new data source 102*a,b* may involve detecting a call (e.g., from the data source 102*a,b*) to provide data 106*a,b* to the data storage system 126 and/or a call (e.g., from the data storage system 126 or an associated administrative device) to receive or collect data 106*a,b* from a data source 102*a,b*. As an example, a new data source 102*a,b* may be detected when a new user 108*a,b* accesses an application 110*a,b* (e.g., when a user 108*a,b* accesses an application 110*a,b* and no data 128, 130 has previously been stored for this user 108*a,b* in the data storage system 126).

Since the data storage system 126 may not initially be configured to receive data 106*a,b* from a new data source 102*a,b*, data source profiling 204 may be performed to determine how the data 106*a,b* from the new data source 102*a,b* should be stored and/or if further infrastructure should be allocated to the data storage system 126 to handle data 106*a,b* from the new data source 102*a,b* (e.g., to determine a storage profile 118 for the new data 106*a,b*). Initially, a default storage profile 118 may be used to accommodate reliable storage of data 106*a,b* from the new data source 102*a,b*, and this profile 118 may be updated following input and usage monitoring 116. In some cases, an initial storage profile 118 may be determined based on characteristics of the new data source 102*a,b*. For example, the initial storage profile 118 may include properties of the data source 102*a,b* (e.g., characteristics of contents of data 106*a,b* provided by the new data source 102*a,b* and a target, such as an intended end user to which data 106*a,b* from the new data source 102*a,b* is to be provided). If a new system 104*a,b* and/or application 110*a,b* is detected, profiling 204 may include determination of characteristics of the infrastructure associated with the system 104*a,b* and/or application 110*a,b* (e.g., the processing, memory, and network infrastructure included in the system 104*a,b* or allocated to the application 110*a,b*). In some cases, the initial storage profile 118 may be determined based on an anticipated file size, data transfer rate, and/or downstream use of the data 106*a,b* received from the new data source 102*a,b*. For example, the storage profile 118 may include an amount of storage space anticipated to be needed to store the data 106a,b provided by the new data source 102a,b.

The DSMS 112 may then perform tagging 206 and cataloging 208 of the data 106a,b provided by the new data source 102a,b. For example, the data 106a,b may be tagged, based at least in part on the initial profile 118. Tags may link, or associate, the data 106a,b to its anticipated downstream use (e.g., by users of the data storage system 126). For example, a first tag may indicate a first portion of the data 106a,b is associated with an account of a user 108a,b, while a second tag indicates another portion of the data 106a,b is associated with a transaction performed using an application 110a,b. Cataloging 208 may be performed to identify how the data 106a,b should be stored in the data storage system 126 (e.g., at a byte level) and what format the data 106a,b should be stored in (e.g., as compressed data 128 or decompressed data 130). The resulting catalog may be included in the storage profile 118 in order to indicate how the data 106a,b is stored in the infrastructure (e.g., at physical and/or virtual address spaces) of the data storage system 126. The storage profile 118 may be used to allocate data storage resources (e.g., memory) of the data storage system 126 for storage of the new data 106a,b provided by the data source 102a,b. The storage profile 118 may also or alternatively be used to perform automatic infrastructure scaling 122, which involves automatically adjusting the computing resources (e.g., memory) provisioned to the data storage system 126, such that the data 106a,b can be stored reliability. As such, the DSMS 112 facilitates the automatic allocation 120 of storage resources of the data storage system 126 for receipt of the new data 106a,b. This allows new data sources 102a,b to provide data 106a,b for storage in the data storage system 126 while avoiding the delays and inefficiencies of previous technology.

Input and usage monitoring 116 may be performed to update the storage profile 118 for the data 106a,b and/or the data source 102a,b based on the history of usage of the data storage system 126, and the updated storage profile 118 may be used to dynamically adjust the storage allocation 120, infrastructure scaling 122, and/or compression/decompression 124. For example, over a period of time following the detection of a new data source 102a,b, usage of the data 106a,b from the data source 102a,b (e.g., as received as data 106a,b or as stored as data 128, 130) may be monitored. For example, events associated with receipt of additional data 106a,b from the data source 102a,b may be monitored (e.g., an amount of the data 106a,b that has been received at different times of the day, month, year, or the like). As another example, events associated with access of portions of the stored data 128, 130 may be detected (e.g., a user accessing data 128, 130 to generate a visualization 134 of the data 128, 130).

The storage profile 118 may be updated based on the monitored input of data 106a,b to the data storage system 126 and usage of the stored data 128, 130. The storage parameters and/or properties included in the storage profile 118 (e.g., schedules of resource allocation, resource provisioning, and/or compression/decompression) may be determined using a method of machine learning or artificial intelligence. For example, the storage profile 118 may be determined or updated based at least in part on the monitored usage of the stored data 128, 130. The storage profile 118 may include a first time period during which a first portion of the stored data 128, 130 is anticipated to be accessed and a second portion of the stored data 128, 130 is not anticipated to be accessed and a second time period during which the first portion of the data 128, 130 is not anticipated to be accessed. These first and second time periods may be stored (e.g., as a compression/decompression schedule) in the storage profile 118 for dynamic compression/decompression 124 of the data 128, 130, such that the appropriate portions of the data 128, 130 are made readily available as decompressed data 130 if likely to be accessed or stored as compressed data 128 if not likely to be accessed. For instance, during at least the first time period, the DSMS 112 may cause the first portion of the data 128, 130 to be in a decompressed format and the second portion of the data 128, 130 to be in a compressed format. During at least the second time period, the DSMS 112 cause the first portion of the data 128, 130 to be in a compressed format.

The different time periods during which compression and decompression of the data 128, 130 are appropriate may be determined by monitoring traffic trends at the data storage system 126. For example, the DSMS 112 may monitor user traffic trends over time at the data storage system 126, data types stored in the data storage system 126, and compression types (e.g., lossy or lossless compression) available to implement on the stored data types. In some cases, certain decompressed data 130 may not be compressed if a lossless compression algorithm is not available for that data type. Any appropriate method may be used to determine trends of the usage of the data 128, 130. For example, an appropriately trained machine learning algorithm may be used to identify trends in the usage of the data storage system 126 over time and determine a schedule for storage allocation 120, infrastructure scaling 122, and/or compression and decompression 124. Based on the traffic trends, a time period (e.g., a continuous interval of times) is determined during which a first data type is accessed at least a threshold number of days per month. During this time period, the first type of data may be stored as decompressed data 130. Similarly, a second time period, may be determined during which the same data type is accessed less than the threshold number of days per month. This data type may be stored as compressed data 128 during the second time period.

The DSMS 112 may dynamically adjust infrastructure scaling 122 by adjusting the computing resources provisioned to the data storage system 126 based on the expected amount of compressed data 128 and decompressed data 130 at any given time. For example, during times when a majority of the data 128, 130 is stored as compressed data 128, fewer storage resources (e.g., memory) may be needed by the data storage system 126. Similarly, when a majority of the data 128, 130 is stored as decompressed data 130, additional data storage resources may be needed by the data storage system 126. For example, the DSMS 112 may determine a period of time during which a threshold portion of the data 128, 130 is anticipated to be accessed (e.g., and stored as decompressed data 130). If an anticipated file size associated with decompressed data 130 during a the identified period of time is greater than a threshold file size (e.g., a percentage of the current storage capacity of the data storage system 126), the DSMS 112 may automatically cause additional data storage resources to be provisioned to the data storage system 126.

Similar approaches to those described above may be used to dynamically adjust and/or schedule the allocation 120 of storage resources for storing data 106a,b from certain data sources 102a,b and/or for infrastructure scaling 122 (e.g., to adjust the computing resources allocated to the data storage system 126). For example, the DSMS 112 may determine, based at least in part on the monitored usage of the stored data 128, 130, a time period during which incoming data 106a,b is anticipated to have a file size that is greater than a threshold file size (e.g., a percentage of the current storage capacity of the data storage system 126). During at least this time period, the DSMS 112 may cause additional data storage resources to be provisioned to the data storage system 126. Similarly, if data 106*a,b* from a given data source 102*a,b* is anticipated to be received during a given period of time, additional storage may be allocated to this data source 102*a,b*.

Example Methods of Operation

Figure 3:
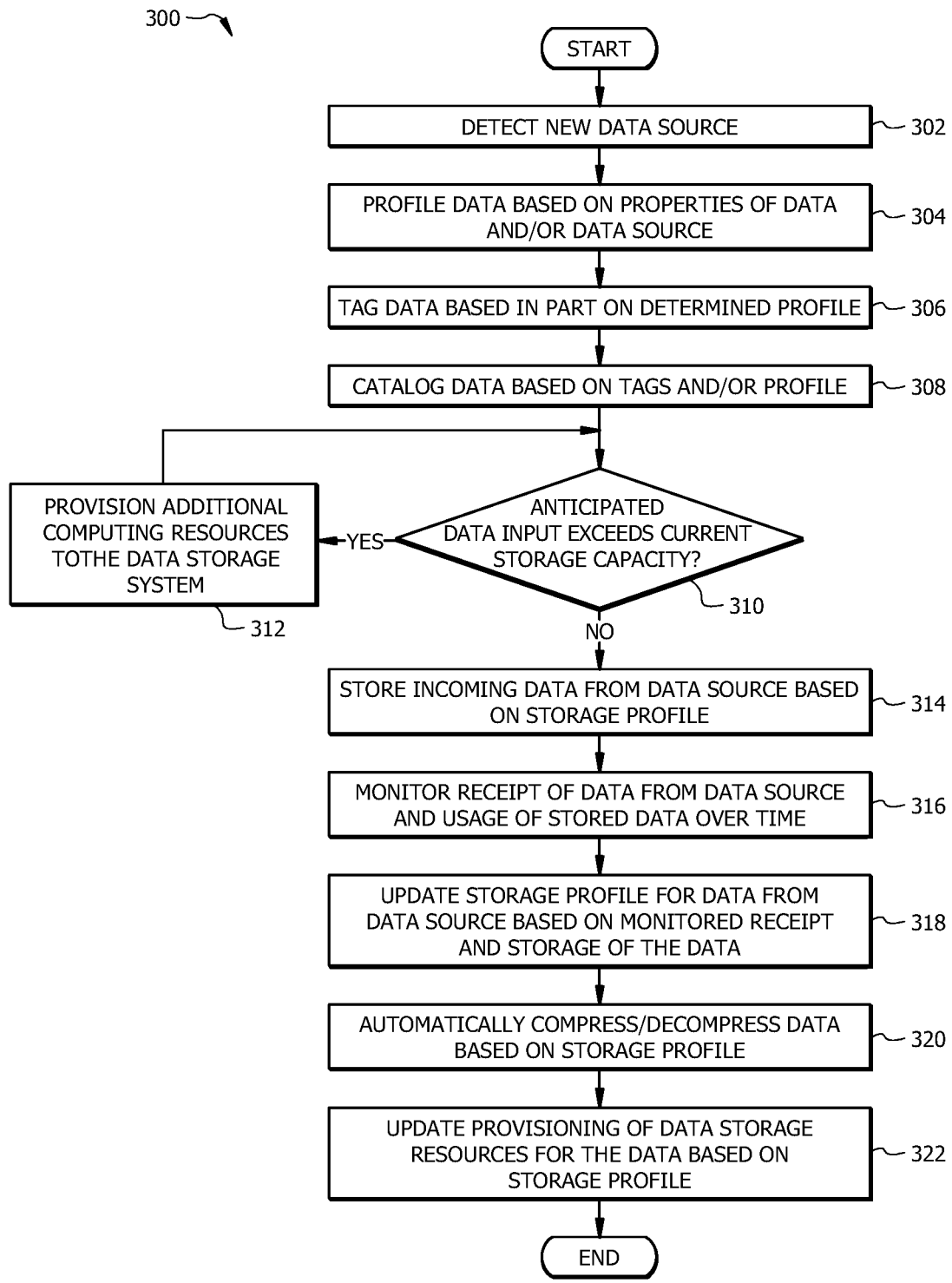
FIG. 3 is a flowchart of a method for operating the system of FIG. 1.

FIG. 3 illustrates a method 300 for operating the system 100 of FIG. 1. The method 300 may begin at step 302 where the DSMS 112 detects a new data source 102*a,b*. As described above, the detection of a new data source 102*a,b* may involve detecting a call (e.g., from the data source 102*a,b*) to provide data 106*a,b* to the data storage system 126 and/or a call (e.g., from the data storage system 126) to receive or collect data 106*a,b* from a data source 102*a,b*. In some cases, a new data source 102*a,b* may be detected when a new user 108*a,b* accesses an application 110*a,b* (e.g., when a user 108*a,b* accesses an application 110*a,b* and no data 128, 130 has previously been stored for this user 108*a,b* in the data storage system 126).

At step 304, the DSMS 112 determines an initial storage profile 118 for the data 106*a,b* from the data source 102*a,b*. As described above, the storage profile 118 generally includes storage parameters and/or properties for configuring the data storage system 126 to store the data 106*a,b* from the newly detected data source 102*a,b*. For instance, parameters in the storage profile 118 may indicate how the data 106*a,b* should be stored and/or an amount of storage resources need to reliably store the data 106*a,b*. The initial storage profile 118 may be a default storage profile (e.g., with predefined storage parameters for the new data source 102*a,b*). Alternatively, the initial storage profile 118 may be determined based on characteristics of the new data source 102*a,b*. For example, the initial storage profile may include, or may be based on, properties of the data source 102*a,b* (e.g., characteristics of contents of data 106*a,b* provided by the new data source 102*a,b* and/or an intended target or downstream user of the data 106*a,b*). If a new system 104*a,b* and/or application 110*a,b* is detected at step 302, the DSMS 112 may determine characteristics of the infrastructure associated with the system 104*a,b* and/or application 110*a,b* (e.g., the processing, memory, and network infrastructure included in the system 104*a,b* or allocated to the application 110*a,b*) and use these characteristics to determine the initial storage profile 118. For example, the initial storage profile 118 may be determined based on an anticipated file size, data transfer rate, and/or downstream use of the data 106*a,b* received from the new data source 102*a,b*. For example, the storage profile 118 may include an amount of storage space anticipated to be needed to store the data 106*a,b* provided by the new data source 102*a,b*.

At step 306, the DSMS 112 may tag the data 106*a,b* based at least in part on the characteristics determined at step 304. For example, the data 106*a,b* may be tagged, based at least in part on the initial profile 118 determined at step 304. Tags may link, or associate, the data 106*a,b* to its anticipated downstream use (e.g., by users of the data storage system 126). At step 308, the DSMS 112 may catalog the data 106*a,b*, based at least in part on the tags from step 308, in order to indicate how the data 106*a,b* should be stored in the data storage system 126 (e.g., at a byte level) and what format the data 106*a,b* should be stored in (e.g., as compressed data 128 or decompressed data 130). For instance, portions of memory if the data storage system 126 may be assigned as indicated in the catalog based on the anticipated storage capacity needed to store data 106*a,b* from the data source 102*a,b*. The resulting catalog may be included in the storage profile 118 in order to indicate how the data 106*a,b* is stored in the infrastructure (e.g., at a physical and/or virtual address) of the data storage system 126.

At step 310, the DSMS 112 may determine if the amount, or size, of data 106*a,b* being provided to the data storage system 126 exceeds the current storage capacity of the system 126 (e.g., or exceeds the amount of storage capacity allocated to the data 106*a,b*). If the data 106*a,b* being provided to the data storage system 126 exceeds the current storage capacity of the system 126, the DSMS 112 may proceed to step 310 where storage allocation 120 is adjusted and/or infrastructure scaling 122 is performed. For example, the DSMS 112 may allocate more storage resources (e.g., memory) of the data storage system 126 for storage of data 106*a,b* from the data source 102*a,b* and/or provision additional storage resources (e.g., memory) to the data storage system 126.

If the amount or size of data 106*a,b* being provided to the data storage system 126 does not exceed the storage capacity allocated to the data 106*a,b*, the DSMS 112 may proceed to step 314, where the data 106*a,b* is stored in the data storage system 126. In some embodiments, the data 106*a,b* may initially be stored as decompressed data 130 (e.g., and older, previously received data 106*a,b* may be compressed to store as compressed data 128 after a predefined period of time). For example, the storage profile 118 determined at step 304 (e.g., and as updated to include tags and/or catalog information from steps 306 and/or 308) may indicate an initial schedule for compression/decompression of the data 128, 130,b stored in the data storage system 126. As described below with respect to the subsequent steps of method 300, the storage profile 118 may be updated over time to dynamically adjust how the data 106*a,b* is stored as compressed data 128 and/or decompressed data 130 and/or how resources are allocated for storage of the stored data 128, 130.

At step 316, the DSMS 112 monitors the input of additional data 106*a,b* and usage of the stored data 128, 130. For example, the DSMS 112 may use the instructions for input and usage monitoring 116 to monitor usage of the data 128, 130 stored by the data storage system 126. For example, the DSMS 112 may detect and monitor events associated with receipt of data (e.g., all or a portion of the data 106*a,b* from the data sources 102*a,b*) by the data storage system 126. The DSMS 112 may detect and monitor events associated with accessing the stored data 128, 130. For example, the DSMS 112 may determine when (e.g., during which hours of the day, which days of the week, and the like) and in what amount the data 128, 130 is commonly accessed by users of the data storage system 126 (e.g., requested for presentation as a visualization 134 in a user front end 132) and/or when and in what amount data 106*a,b* from a given data source 102*a,b* is typically received by the data storage system 126. For example, over a period of time following the detection of a data source 102*a,b*, usage of the data 106*a,b* from the data source 102*a,b* (e.g., as received as data 106*a,b* or as stored as data 128, 130) may be monitored. For example, events associated with receipt of additional data 106*a,b* from the data source 102*a,b* may be monitored (e.g., an amount of the data 106*a,b* that has been received at different times of the day, month, year, or the like). As another example, events associated with access of portions of the data 128, 130 may be detected (e.g., a user accessing data 128, 130 to generate a visualization 134 of the data 128, 130).

At step 318, the DSMS 112 updates the storage profile 118 for the data 106a,b from data source 102a,b and/or related stored data 128, 130 from the same data source 102a,b, based on information obtained at step 316 (e.g., based on the history of usage of the data storage system 126). The properties and/or parameters included in the storage profile 118 (e.g., schedules of resource allocation, resource provisioning, and/or compression/decompression) may be determined using a method of machine learning or artificial intelligence. For example, the storage profile 118 may be determined or updated based at least in part on the monitored input of data 106a,b and/or the usage of the stored data 128, 130 (from step 316). For instance, the storage profile 118 may include a first time period during which a first portion of the data 128, 130 is anticipated to be accessed and a second portion of the stored data 128, 130 is not anticipated to be accessed and a second time period during which the first portion of the data 128, 130 is not anticipated to be accessed. These first and second time periods may be stored (e.g., as part of a compression/decompression schedule) in the storage profile 118 for dynamic compression/decompression 124 of the data 128, 130, such that the appropriate portions of the data 128, 130 are stored as decompressed data 130 if likely to be accessed or compressed data 128 if not likely to be accessed (see step 320).

At step 320, the DSMS 112 uses the storage profile 118 to compress and/or decompress at least a portion of the stored data 128, 130. For example, during at least the first time period identified at step 318, the DSMS 112 may cause the first portion of the data 128, 130 to be stored as decompressed data 130 and the second portion of the data 128, 130 to be stored as compressed data 128. During at least the second time period identified at step 318, the DSMS 112 may cause the first portion of the data 128, 130 to be stored as compressed data 128 (e.g., because this portion of the data 128, 130 is not likely to be accessed during the second time period).

At step 322, the DSMS 112 uses the storage profile 118 to allocate data storage resources (e.g., memory) of the data storage system 126 for storage of data 106a,b provided by the data source 102a,b. The storage profile 118 may also or alternatively be used to perform automatic infrastructure scaling 122, which involves automatically adjusting the computing resources (e.g., memory) provisioned to the data storage system such that the data 106a,b can be stored reliability. As such, the DSMS 112 facilitates the automatic allocation 120 of storage resources of the data storage system 126 for receipt of the new data 106a,b. This allows new data sources 102a,b to provide data 106a,b for storage in the data storage system 126 while avoiding instances where inadequate storage resources are available to store provided data 106a,b.

Example Device for API Integration

FIG. 4 illustrates an embodiment of a device 400 configured to implement various components of the system 100. One or more devices 400 may be used to implement the data sources 102a,b, DSMS 112, data storage system 126, user front end 132, and administrator monitor 136 of FIG. 1. The device 400 includes a processor 402, a memory 404, and a network interface 406. The device 400 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 200 of FIG. 2 and the method 300 of FIG. 3. In some embodiments, the function described herein is implemented using logic units, FPGAs, ASICs, DSPs, or any other suitable hardware or electronic circuitry.

The memory 404 is operable to store any of the information described above with respect to FIGS. 1-3 along with any other data, instructions, logic, rules, or code operable to execute the function described herein. For example, the memory 404 may store the data 106a,b, 128, 130 and storage profiles 118 of FIG. 1 described above with respect to FIGS. 1-3. The memory 404 may also store detection instructions 408, which include any logic, code, and/or rules for implementing new data source handling 114 functions of the DSMS 112 (e.g., for detection 202 of FIG. 2), described above with respect to FIGS. 1-3. The memory 404 may also store profiling instructions 410, which include any logic, code, and/or rules for implementing new data source handling 114 functions of the DSMS 112 (e.g., for profiling 204 of FIG. 2), described above with respect to FIGS. 1-3. The memory 404 may also store tagging instructions 412, which include any logic, code, and/or rules for implementing new data source handling 114 functions of the DSMS 112 (e.g., for tagging 206 of FIG. 2), described above with respect to FIGS. 1-3. The memory 404 may also store cataloging instructions 414, which include any logic, code, and/or rules for implementing new data source handling 114 functions of the DSMS 112 (e.g., for cataloging 208 of FIG. 2), described above with respect to FIGS. 1-3. The memory 404 may also store monitoring instructions 416, which include any logic, code, and/or rules for implementing the input and usage monitoring 116 functions of the DSMS 112, described above with respect to FIGS. 1-3. The memory 404 may also store compression/decompression instructions 418, which include any logic, code, and/or rules for implementing compression/decompression 124 functions of the DSMS 112 and/or data storage system 126, described above with respect to FIGS. 1-3. The memory 404 may also store storage allocation instructions 420, which include any logic, code, and/or rules for implementing storage allocation 120 functions of the DSMS 112, described above with respect to FIGS. 1-3. The memory 404 may also store infrastructure scaling instructions 422, which include any logic, code, and/or rules for implementing infrastructure scaling 122 functions of the DSMS 112, described above with respect to FIGS. 1-3. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a data storage system configured to store data from one or more data sources; and
   a storage management subsystem communicatively coupled to the data storage system and comprising a processor configured to:
      monitor usage of the data from the one or more data sources stored by the data storage system, wherein the usage of the stored data comprises events associated with receipt of additional data by the data storage system and access to portions of the stored data;
      determine, based at least in part on the monitored usage of the stored data, a storage profile for the stored data, wherein the storage profile for the stored data indicates:
         a first time period during which a first portion of the stored data is anticipated to be accessed and a second portion of the stored data is not anticipated to be accessed, and
         a second time period during which the first portion of the stored data is not anticipated to be accessed;
      during at least the first time period, cause the first portion of the stored data to be in a decompressed format and the second portion of the stored data to be in a compressed format; and
      during at least the second time period, cause the first portion of the stored data to be in the compressed format.

2. The system of claim 1, wherein the processor is further configured to determine the storage profile for the stored data by:
   monitoring user traffic trends over time at the data storage system, wherein the monitored user traffic trends comprise a history of requested access to the stored data as a function of time;
   determining, based on the monitored user traffic trends, the first time period, wherein the first time period is a time interval during which a first data type is accessed at least a threshold number of times per unit time, and wherein the first portion of the stored data is of the first data type; and
   determining, based on the monitored user traffic trends, the second time period, wherein the second time period is a continuous range of times during which the first data type is accessed less than the threshold number of times per unit time.

3. The system of claim 1, wherein the processor is further configured to:
   determine, based at least in part on the monitored usage of the stored data, a third time period during which both the first and second portions of the stored data are anticipated to be accessed;
   determine a file size associated with storing the first and second portions of the stored data in the decompressed format;
   determine that the file size associated with storing the first and second portions of the stored data is greater than a threshold file size, wherein the threshold file size is based on a maximum storage capacity of the data storage system; and
   during at least the third time period, cause additional data storage resources to be provisioned to the data storage system.

4. The system of claim 1, wherein the processor is further configured to:
   determine, based at least in part on the monitored usage of the stored data, a third time period during which incoming data is anticipated to have a file size that is greater than a threshold file size, wherein the threshold file size is associated with a storage capacity of the data storage system; and
   during at least the third time period, cause additional data storage resources to be provisioned to the data storage system.

5. The system of claim 1, wherein the processor is further configured to:
   detect a new data source associated with one or more of a user, a system, or an application for which the data storage system is not configured to receive data; and
   automatically allocate a portion of data storage resources of the data storage system for storage of data provided by the new data source.

6. The system of claim 5, wherein the processor is further configured to:
   determine properties of the new data source, wherein the determined properties of the new data source comprise one or both of characteristics of contents of data provided by the new data source and a target to which data from the new data source is to be provided;

tag data provided by the new data source based on the determined properties of the new data source, wherein the tagged data is associated with an anticipated use of the data by users of the data storage system;

determine, based at least in part on the tagged data, a catalog indicating which portion of the data storage resources of the data storage system are to be allocated to the data storage system; and allocate the portion of the data storage resources of the data storage system based on the determined catalog.

7. The system of claim 5, wherein the processor is further configured to:

over a period of time following the detection of the new data source, monitor usage of the data provided by the new data source stored by the data storage system, wherein the usage of the data provided by the new data source stored by the data storage system comprises events associated with receipt of additional data from the new data source and access of portions of the data provided by the new data source;

update the storage profile for the data provided by the new data source, based on the usage of the data provided by the new data source; and adjust the allocation of the portion of the data storage resources of the data storage system for the data provided by the new data source based on the updated storage profile for the data provided by the new data source.

8. A method comprising:

monitoring usage of data from one or more data sources stored by a data storage system, wherein the usage of the stored data comprises events associated with receipt of additional data by the data storage system and access to portions of the stored data;

determining, based at least in part on the monitored usage of the stored data, a storage profile for the stored data, wherein the storage profile for the stored data indicates:
    a first time period during which a first portion of the stored data is anticipated to be accessed and a second portion of the stored data is not anticipated to be accessed, and
    a second time period during which the first portion of the stored data is not anticipated to be accessed;

during at least the first time period, causing the first portion of the stored data to be in a decompressed format and the second portion of the stored data to be in a compressed format; and during at least the second time period, causing the first portion of the stored data to be in the compressed format.

9. The method of claim 8, wherein the method further comprises determining the storage profile for the stored data by:

monitoring user traffic trends over time at the data storage system, wherein the monitored user traffic trends comprise a history of requested access to the stored data as a function of time;

determining, based on the monitored user traffic trends, the first time period, wherein the first time period is a time interval during which a first data type is accessed at least a threshold number of times per unit time, and wherein the first portion of the stored data is of the first data type; and determining, based on the monitored user traffic trends, the second time period, wherein the second time period is a continuous range of times during which the first data type is accessed less than the threshold number of times per unit time.

10. The method of claim 8, wherein the method further comprises:

determining, based at least in part on the monitored usage of the stored data, a third time period during which both the first and second portions of the stored data are anticipated to be accessed;

determining a file size associated with storing the first and second portions of the stored data in the decompressed format;

determine that the file size associated with storing the first and second portions of the stored data is greater than a threshold file size, wherein the threshold file size is based on a maximum storage capacity of the data storage system; and during at least the third time period, causing additional data storage resources to be provisioned to the data storage system.

11. The method of claim 8, wherein the method further comprises:

determining, based at least in part on the monitored usage of the stored data, a third time period during which incoming data is anticipated to have a file size that is greater than a threshold file size, wherein the threshold file size is associated with a storage capacity of the data storage system; and during at least the third time period, causing additional data storage resources to be provisioned to the data storage system.

12. The method of claim 8, wherein the method further comprises:

detecting a new data source associated with one or more of a user, a system, or an application for which the data storage system is not configured to receive data; and automatically allocating a portion of data storage resources of the data storage system for storage of data provided by the new data source.

13. The method of claim 12, wherein the method further comprises:

determining properties of the new data source, wherein the determined properties of the new data source comprise one or both of characteristics of contents of data provided by the new data source and a target to which data from the new data source is to be provided;

tagging data provided by the new data source based on the determined properties of the new data source, wherein the tagged data is associated with an anticipated use of the data by users of the data storage system;

determining, based at least in part on the tagged data, a catalog indicating which portion of the data storage resources of the data storage system are to be allocated to the data storage system; and allocating the portion of the data storage resources of the data storage system based on the determined catalog.

14. The method of claim 12, wherein the method further comprises:

over a period of time following the detection of the new data source, monitoring usage of the data provided by the new data source stored by the data storage system, wherein the usage of the data provided by the new data source stored by the data storage system comprises events associated with receipt of additional data from the new data source and access of portions of the data provided by the new data source;

updating the storage profile for the data provided by the new data source, based on the usage of the data provided by the new data source; and adjusting the allocation of the portion of the data storage resources of the data storage system for the data provided by the new data source based on the updated storage profile for the data provided by the new data source.

15. A device comprising:
a network interface communicatively coupled to a data storage system configured to store data from one or more data sources; and
a processor configured to:
monitor usage of the data from the one or more data sources stored by the data storage system, wherein the usage of the stored data comprises events associated with receipt of additional data by the data storage system and access to portions of the stored data;
determine, based at least in part on the monitored usage of the stored data, a storage profile for the stored data, wherein the storage profile for the stored data indicates:
a first time period during which a first portion of the stored data is anticipated to be accessed and a second portion of the stored data is not anticipated to be accessed, and
a second time period during which the first portion of the stored data is not anticipated to be accessed;
during at least the first time period, cause the first portion of the stored data to be in a decompressed format and the second portion of the stored data to be in a compressed format; and
during at least the second time period, cause the first portion of the stored data to be in the compressed format.

16. The device of claim 15, wherein the processor is further configured to determine the storage profile for the stored data by:
monitoring user traffic trends over time at the data storage system, wherein the monitored user traffic trends comprise a history of requested access to the stored data as a function of time;
determining, based on the monitored user traffic trends, the first time period, wherein the first time period is a time interval during which a first data type is accessed at least a threshold number of times per unit time, and wherein the first portion of the stored data is of the first data type; and
determining, based on the monitored user traffic trends, the second time period, wherein the second time period is a continuous range of times during which the first data type is accessed less than the threshold number of times per unit time.

17. The device of claim 15, wherein the processor is further configured to:
determine, based at least in part on the monitored usage of the stored data, a third time period during which both the first and second portions of the stored data are anticipated to be accessed;
determine a file size associated with storing the first and second portions of the stored data in the decompressed format;
determine that the file size associated with storing the first and second portions of the stored data is greater than a threshold file size, wherein the threshold file size is based on a maximum storage capacity of the data storage system; and
during at least the third time period, cause additional data storage resources to be provisioned to the data storage system.

18. The device of claim 15, wherein the processor is further configured to:
determine, based at least in part on the monitored usage of the stored data, a third time period during which incoming data is anticipated to have a file size that is greater than a threshold file size, wherein the threshold file size is associated with a storage capacity of the data storage system; and
during at least the third time period, cause additional data storage resources to be provisioned to the data storage system.

19. The device of claim 15, wherein the processor is further configured to:
detect a new data source associated with one or more of a user, a system, or an application for which the data storage system is not configured to receive data; and
automatically allocate a portion of data storage resources of the data storage system for storage of data provided by the new data source.

20. The device of claim 19, wherein the processor is further configured to:
determine properties of the new data source, wherein the determined properties of the new data source comprise one or both of characteristics of contents of data provided by the new data source and a target to which data from the new data source is to be provided;
tag data provided by the new data source based on the determined properties of the new data source, wherein the tagged data is associated with an anticipated use of the data by users of the data storage system;
determine, based at least in part on the tagged data, a catalog indicating which portion of the data storage resources of the data storage system are to be allocated to the data storage system; and
allocate the portion of the data storage resources of the data storage system based on the determined catalog.

* * * * *